Dec. 1, 1953     M. L. MUNDY     2,660,804
LEVEL INDICATING DEVICE FOR HOUSE TRAILERS
Filed Jan. 26, 1952
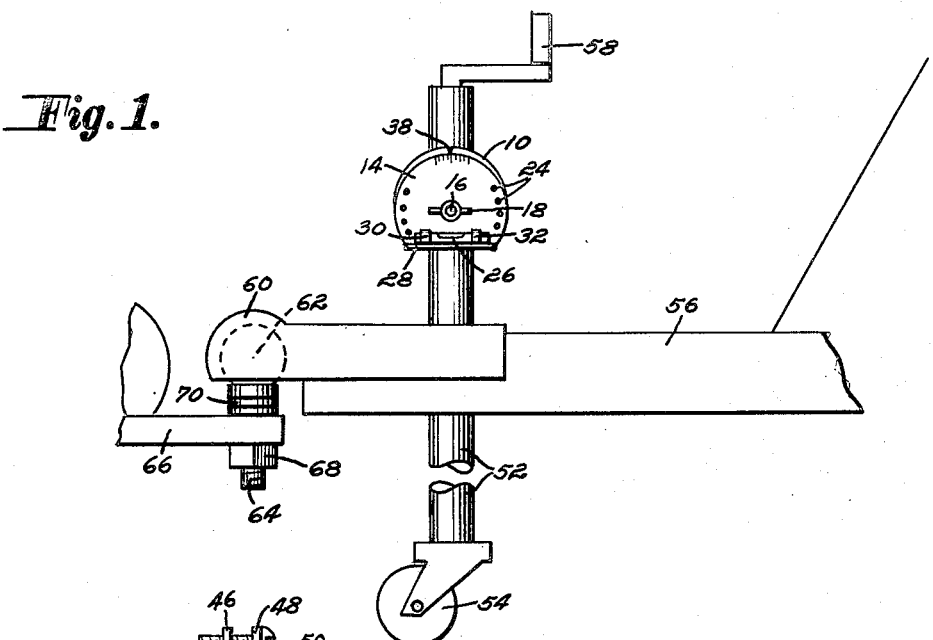
Fig. 1.
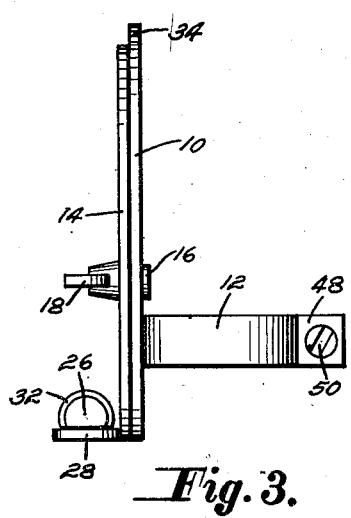
Fig. 2.
Fig. 3.
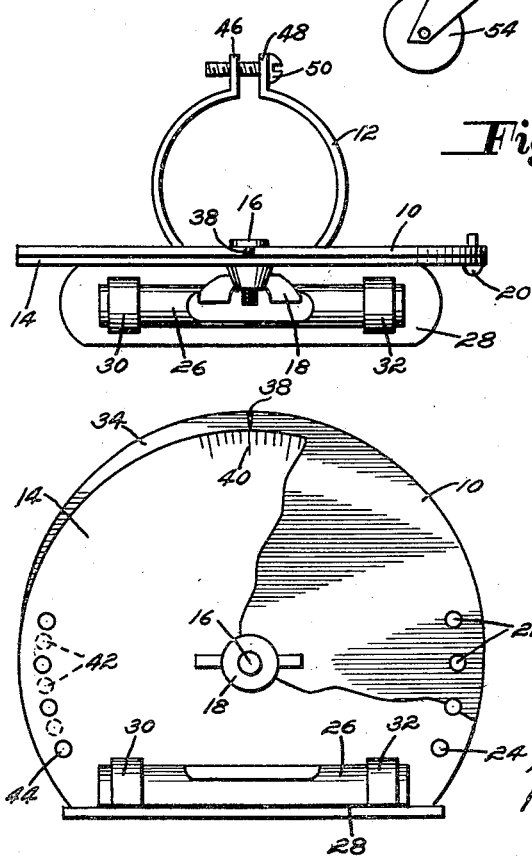
Fig. 4.
INVENTOR.
Michael L. Mundy
BY Arthur H. Sturges
Attorney Patented Dec. 1, 1953

2,660,804

UNITED STATES PATENT OFFICE 2,660,804

LEVEL INDICATING DEVICE FOR HOUSE TRAILERS

Michael L. Mundy, North Bend, Nebr.

Application January 26, 1952, Serial No. 268,441

1 Claim. (Cl. 33—207)

This invention relates to leveling devices for trailers and the like and particularly where trailers are attached to towing vehicles with hitches, and in particular this invention includes a level in combination with a graduated dial whereby with the dial set so that the level indicates the horizontal position of the floor of the trailer the dolly wheel of the hitch bar and the ball of the hitch socket may readily be adjusted to retain the floor of the trailer in a horizontal or level position.

The purpose of this invention is to provide permanent means whereby the floor of a trailer may be adjusted to a level position with the trailer stationary, or with the trailer attached to a towing vehicle for traveling.

It is generally understood that the floor of a trailer should be level for the best towing operations, and it is also more desirable to maintain the floor of the trailer level when the trailer is parked for use as living quarters. In numerous instances it is difficult to obtain a spirit level or other means for determining whether or not the floor of a trailer is level, and when the trailer is positioned on uneven ground it is difficult to determine whether or not the floor is level with the eye.

With this thought in mind this invention contemplates a level mounting whereby a level is permanently positioned on hitch elements of a trailer so that one may readily determine when the floor of the trailer is level.

The object of this invention is, therefore, to provide means whereby a level, such as a spirit level, may be permanently mounted on or in combination with a trailer hitch whereby the level may readily be adjusted to correspond with the floor of the trailer.

Another object of the invention is to provide a level mounting for permanently attaching a level to parts of a trailer hitch with which the level of the floor may be determined with the trailer in both traveling and parked positions.

A further object of the invention is to provide a permanent level mounting for a trailer hitch in which the position of the level in the mounting is adjustable.

A still further object of the invention is to provide leveling means in combination with a trailer hitch which is adapted to remain permanently in position on the hitch without interfering with conventional hitch operating parts.

And a still further object of the invention as disclosed is to provide a permanent level mounting for a trailer hitch in which the mounting is of a simple and economical construction.

With these and other objects and advantages in view the invention embodies a backing or base plate having a clamp for attaching the plate to a dolly wheel post of a trailer hitch, a graduated plate pivotally mounted on said base plate, a level carried by the graduated plate, and a pin extended through registering openings in the graduated and base plates for retaining the graduated plate in adjusted positions on the base plate.

Other features and advantages of the invention will appear from the following description taken in connection with the drawing, wherein:

Figure 1 is a side elevational view of a trailer hitch showing the improved level mounted on the dolly wheel post thereof and with parts broken away.

Figure 2 is a plan view illustrating the level mounting with the parts shown on an enlarged scale.

Figure 3 is an end elevational view of the level mounting also showing the parts on an enlarged scale.

Figure 4 is a front elevational view of the level mounting, similar to that shown in Figure 1, and with the parts on an enlarged scale as in Figures 2 and 3.

Referring now to the drawings wherein like reference characters denote corresponding parts the trailer hitch level mounting of this invention includes a base plate 10 having a clamp 12 extended from the back thereof, a graduated plate 14 pivotally mounted on the base plate 10 with a stud 16 having a wing or thumb nut 18 threaded thereon, a pin 20 adapted to be inserted in openings 22 of the base plate 10 and 24 of the plate 14 for retaining the plate 14 in adjusted positions on the base plate 10, and a level 26 which is secured on a shelf 28 of the plate 14 with bands 30 and 32.

Both of the plates 10 and 14 are provided with circular upper portions and flat lower sides, and the intermediate portion 34 of the plate 10 extends above the corresponding portion of the plate 14 whereby a notch 36 in the edge of the plate 10 may be positioned to register with graduations 40 on the edge of the plate 14.

The openings 22 and 24 are provided in the plates on one side of the mounting and with additional openings 42, in the plate 10 and 44 in the plate 14, on the opposite side of the mounting, and with the openings 44 staggered in relation to the openings 42 comparatively minute adjustments may be made in the relative positions of the plates, thereby providing means for accurately setting the level so that it corresponds with the horizontal position of the floor of the trailer.

The ends of the sections of the clamp 12 are provided with flanges 46 and 48 and a screw 50 is extended through an opening in the flange 48 and threaded into the flange 46 so that the base plates 10 may be clamped in operative position on a post 52 of a dolly wheel 54 of a hitch bar 56, as shown in Figure 1.

The post 52 is provided with a hand crank 58 for adjusting the elevation of the hitch bar in relation to the dolly wheel, and the hitch bar is provided with a socket 60 which is positioned to receive a ball 62 on the upper end of a stud 64 which is secured in a bar 66 of a towing vehicle with a nut 68 that is threaded on the lower end of the stud.

The elevation of the ball in relation to the bar 66 is adjusted with shims 70 to compensate for the difference between the elevation of the hitch bar and the bar 66.

With the parts arranged in this manner the level 26 with the graduated plate 14 and the base plate 10, are clamped on the post 52 and with a conventional level on the floor of the trailer the plate 14 is adjusted on the plate 10 until the level 26 corresponds with the conventional level on the trailer floor, and by use of the wing nut 18, and the pin 20 the plate 14 is secured in position on the base plate 10. With the level 26 fixed to show when the floor of the trailer is level the floor of the trailer may readily be adjusted with the hand crank 58 when the trailer is parked for use as living quarters, and with the floor of the trailer accurately adjusted the ball of the hitch is adjusted with shims so that the ball nests in the hitch socket, whereby the floor of the trailer is also readily adjusted for traveling.

From the foregoing description it is thought to be obvious that a leveling device for house trailers constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

A level indicator for use on a trailer hitch comprising a circular vertically positioned base plate having a flat portion on the lower side and having a notch in the upper edge, a circular graduated plate also having a flat portion on the lower side positioned against the face of the base plate and having graduations thereon positioned to register with the notch of the base plate, said notch of the base plate being positioned in a plane perpendicular to said flat side and extended through the center of said plates, a stud having a thumb nut thereon mounted in the base plate and extended through the center of said graduated plate pivotally mounting the graduated plate on the base plate, said stud positioned whereby the flat portion of the graduated plate coincides with the flat portion of the base plate with a certain graduation of the graduated plate in registering relation with the notch of the base plate and wherein the upper edge of the graduated plate is spaced from the upper edge of the base plate, said graduated plate having a horizontally disposed shelf extended from the flat portion of the lower side, a level mounted on said shelf, said plates having rows of spaced openings therethrough and said openings being positioned in circles concentric with the center of the stud, a pin extended through said openings for retaining the plates in adjusted positions, and a clamp extended from said base plate.

MICHAEL L. MUNDY.

References Cited in the file of this patent

UNITED STATES PATENTS

| Number | Name | Date |
|---|---|---|
| 449,609 | Green | Mar. 31, 1891 |
| 948,523 | Perkins | Feb. 8, 1910 |
| 1,456,431 | Frank | May 22, 1923 |
| 1,940,808 | Linsert | Dec. 26, 1933 |
| 1,986,149 | Harris | Jan. 1, 1935 |
| 2,129,695 | Karnes | Sept. 13, 1938 |
| 2,277,071 | Cassell | Mar. 24, 1942 |
| 2,469,506 | Kerr et al. | May 10, 1949 |

FOREIGN PATENTS

| Number | Country | Date |
|---|---|---|
| 319,805 | France | Nov. 24, 1902 |
| 681,616 | France | May 16, 1930 |